United States Patent [19]

Tsuneyoshi

[11] Patent Number: 5,479,383
[45] Date of Patent: Dec. 26, 1995

[54] RETRIEVAL APPARATUS WITH REPEATED RETRIEVAL OF INPUTTED CHARACTERS

[75] Inventor: Kazuyuki Tsuneyoshi, Fukuoka, Japan

[73] Assignee: Matsushita Electric Industrial Co., Ltd., Osaka, Japan

[21] Appl. No.: 31,406

[22] Filed: Mar. 15, 1993

[30] Foreign Application Priority Data

Mar. 23, 1992 [JP] Japan .................................. 4-064510

[51] Int. Cl.⁶ .................................................. G11B 13/00
[52] U.S. Cl. ........................................ 369/14; 364/419.07
[58] Field of Search .................................. 369/14, 13, 15, 369/32, 275.2, 47, 59; 395/164, 145, 600, 500; 364/200, 261, 232.7, 419.07, 925.06, 236.8

[56] References Cited

U.S. PATENT DOCUMENTS 4,542,477  9/1985  Noyori et al. ........................... 364/200
4,964,039 10/1990  Izawa et al. ............................. 364/200

FOREIGN PATENT DOCUMENTS

2657348  6/1978  Germany .
3118180  2/1982  Germany .

Primary Examiner—Ali Neyzari
Attorney, Agent, or Firm—Lowe, Price, LeBlanc & Becker

[57] ABSTRACT

A retrieval apparatus for retrieving information in a data storage medium. The retrieval apparatus includes a decision function for deciding the longest character train corresponding to an inputted character train which exists on the storage medium and a correction function for converting the inputted retrieval character train into the longest character train existing on the storage medium. In the case that the item corresponding to the inputted retrieval character train does not exist within the storage medium, the decision function detects the maximum effective portion of the retrieval character train and the correction function changes the retrieval character train to the longest character train in response to a correction instruction by the operator.

10 Claims, 9 Drawing Sheets

LEAST SIGNIFICANT LEVEL DECISION ELEMENT :

POINTER TO INDEX INFORMATION X1
HEAD ITEM OF INDEX INFORMATION X1
END ITEM OF INDEX INFORMATION X1
POINTER TO INDEX INFORMATION X2
HEAD ITEM OF INDEX INFORMATION X2
END ITEM OF INDEX INFORMATION X2
⋮

FIG. 5B

NON-LEAST SIGNIFICANT LEVEL DECISION ELEMENT :

POINTER TO INFORMATION X1
ITEM OF INFORMATION X1
POINTER TO INFORMATION X2
ITEM OF INFORMATION X2
⋮

WORD RETRIEVAL (FORWARD COINCIDENCE)
PLEASE INPUT RETRIEVAL WORD

[ chrsamthenum                                                    ]

| DELETION | RETURN | RETRIEVAL |

RETRIEVAL APPARATUS WITH REPEATED RETRIEVAL OF INPUTTED CHARACTERS

BACKGROUND OF THE INVENTION

The present invention relates to a retrieval apparatus for retrieving information in a data storage medium especially for retrieving information in a data storage medium such as an optical disc.

Figure 10:
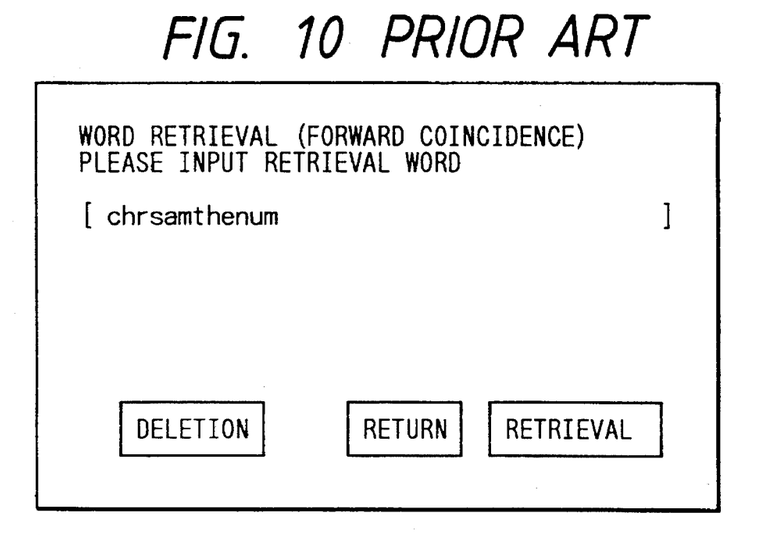
FIG. 10 is an illustration of an indication by a conventional retrieval apparatus.

As one of known retrieval systems using an optical disc, there is known a so-called electronic book wherein information is retrieved in accordance with predetermined retrieval systems. In one optical disc used with such a system there are recorded a plurality of documents such as an English-English dictionary and a biographical dictionary each of which is selected and retrieved in accordance with one or plural retrieval systems such as a forward coincidence system and a condition retrieval system. According to a conventional retrieval apparatus, after selection of one retrieval system, a retrieval character train (word) is inputted, for example, inputted in accordance with a forward coincidence retrieval system as shown in FIG. 10 where the current inputted character train is displayed on a screen. In addition, on the; screen there are displayed a deletion function for erasing the inputted character train, a return function for interrupting the input of the retrieval character train and a retrieval function for retrieving the inputted character train. These three functions can be effected by operating function keys on a keyboard, not shown. When the operator indicates the retrieval function, the retrieval apparatus retrieves index information on the optical disc to check whether items corresponding to the inputted character train exist in the index information on the optical disc. If the items exist, the retrieval apparatus displays all the items on the screen and, if the items do not exist in the index information, the apparatus displays that the corresponding item does not exist.

There is a problem which arises with such a conventional retrieval apparatus, however, in that, if a character train "chrsamthenum" is inputted by mistake in the case that a character train "chrsamthemum" should be inputted as a retrieval character train, difficulty is encountered to check the meaning or content of the retrieval character train. That is, according to the conventional retrieval apparatus, only after retrieval and display of the corresponding item, it can be checked whether the inputted character train is effective or appropriate as a retrieval character train. In other words, if the item corresponding to the inputted character train does not exist, it is impossible to obtain the information indicative of the effective retrieval character train. This causes inconvenience for the user or operator.

SUMMARY OF THE INVENTION

It is therefore an object of the present invention to provide a retrieval apparatus which has an input-error decision and correction function to improve convenience for the user.

According to this invention, the retrieval apparatus comprises inputting means for inputting a retrieval character train, reading means for reading information recorded in the storage medium; retrieving means for successively retrieving the information at every input of each of the characters of the retrieval character train; and decision means for checking, in response to the successive retrieval by to the retrieving means, whether a character train made by the characters retrieved by the retrieving means exists in the information. Preferably, the retrieval apparatus further comprises storage means for storing the character train when the decision means decides that the character train exists in the storage medium and conversion means for converting the inputted retrieval character train into the character train finally stored in the storage medium.

Further, according to this invention, there is provided a retrieval apparatus comprising: inputting means for inputting a retrieval character train; reading means for reading information recorded in the storage medium; retrieving means for retrieving whether the inputted retrieval character train exists in the storage medium; decision means for deciding as a longest character train a character train which is a maximum coincidence between the inputted retrieval character train and a character train existing in the storage medium; and conversion means for converting the inputted retrieval character train into the longest character train decided by the decision means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
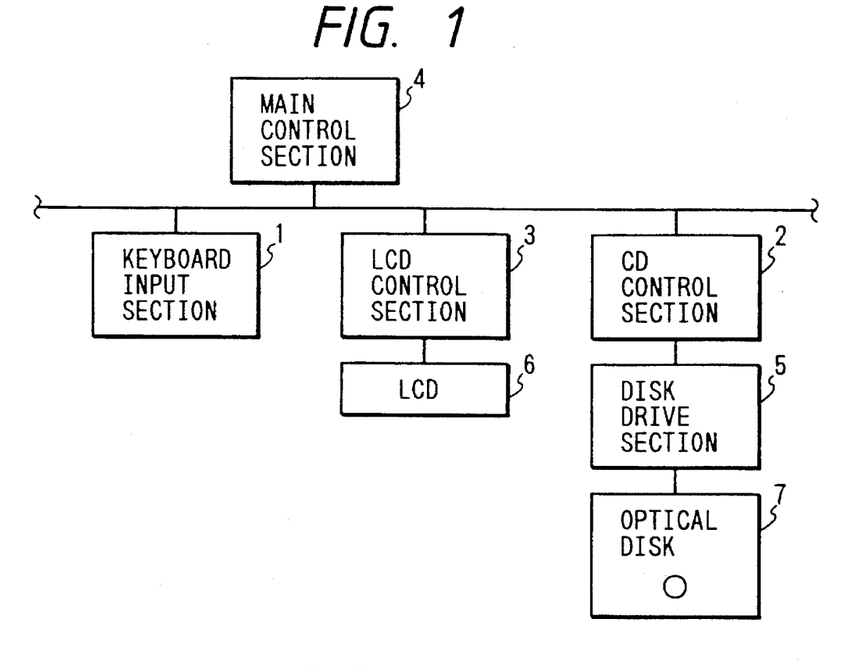
FIG. 1 is a block diagram showing the entire arrangement of an optical disc retrieval apparatus according to an embodiment of this invention.
Figure 2:
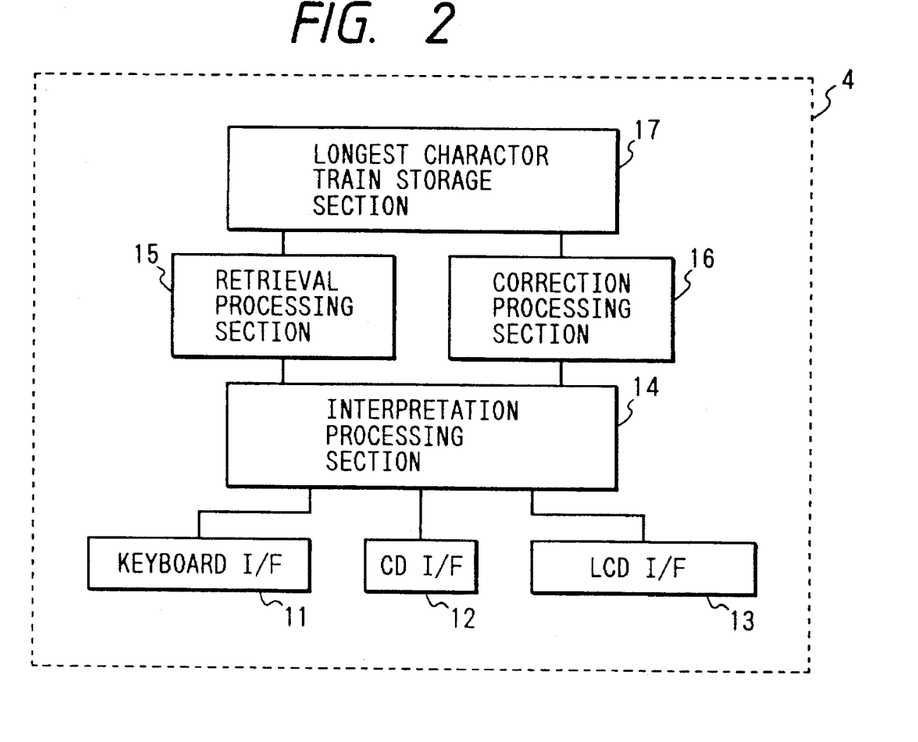
FIG. 2 is a block: diagram showing an arrangement of a main control section of the FIG. 1 retrieval apparatus.

A description will be made hereinbelow in terms of an embodiment of this invention. FIG. 1 shows an entire arrangement of a retrieval apparatus according to the embodiment of this invention. In FIG. 1, the retrieval apparatus comprises an input section 1 including a keyboard, an optical disc drive section 5 for reading out information on an optical disc 7, a CD control section 2 for controlling the optical disc drive section 5, an LCD control section 3 for controlling a liquid crystal display (LCD) 6, and a main control section 4. The main control section 4, as illustrated in FIG. 2, includes a keyboard I/F section 11 for exchange of information with respect to the keyboard input section 1, a CD I/F section 12 for exchange of information with respect to the CD control section 2, an LCD I/F section 13 for exchange of information with respect to the LCD control section 3, an interpretation processing section 14 for determining a process to be executed on the basis of an input by the operator, a retrieval processing section 15 for performing a retrieval in accordance with a retrieval character train inputted by the operator, a correction processing section 16 for performing a correction process of the retrieval character train inputted by the operator, and a longest retrieval character train storage section 17. The main control section 4 performs the retrieval process on the basis of information obtained through the keyboard input section 1 and the CD control section 2 and displays the retrieval process result on the LCD 6 through the LCD control section 3. Further, the main control section has a correction function for the inputted retrieval character train.

Here, the outline of the correction function (process) in this embodiment will briefly be described. In performing the retrieval process with respect to the retrieval character train inputted by the operator, there is the possibility that the content corresponding to the retrieval character train does not exist. Such a situation can occur when an input error occurs on the way of the input of the retrieval character train for example, when a character train "EDAT" is inputted by mistake in the case that a retrieval character train "EDIT" should be inputted. In this case, it is preferable to return the inputting state up to the state immediately before the input of the character "A" (the state that the characters ED are inputted). This returning function is the correction function. More specifically, the correction function is a function to delete characters of a character train in order from the end character when the corresponding item does not exist, thereby converting the character train into a correct retrieval character train having the corresponding item.

In the retrieval operation, when the operator mounts the optical disc 7 on the optical disc retrieval apparatus and presses a start button, a start request signal is generated to be supplied through the keyboard inputting section 1 and the keyboard I/F section 11 to the interpretation processing section 14. The interpretation processing section 14 instructs the CD control section 2, through the CD I/F section 12, to read out the document information. The CD control section 2 informs the interpretation processing section 14 through the CD I/F section 12, of the number and names of the documents in the optical disc 7. The interpretation processing section 14 displays, through the LCD I/F section and the LCD control section 3, the number and names of the documents on the LCD 6. The operator selects one desired document from the documents displayed on the LCD 6. For selection, the operator operates a movement key to move a cursor up to the document position on the LCD 6 and then presses a decision key. Although not described in detail, the interpretation processing section 14 also performs the processes to be taken when pressing the movement key and the decision key.

In response to the designation of the document, the interpretation processing section 14 instructs the CD control section 2 through the CD I/F section 12, to input retrieval systems provided in correspondence with each of the documents, thereby obtaining information relating to the existing retrieval systems to display a list of the obtained retrieval systems on the LCD 6 through the LCD I/F section 13. The operator selects a desired retrieval system from the displayed retrieval systems as well as in the document selection. When the selected retrieval system is one of the forward coincidence system, backward coincidence system, condition system and complex system, the interpretation processing section 14 displays a picture for input of a retrieval character train on the LCD 6. The operator inputs a retrieval character train in the picture. The characters of the retrieval character train inputted are supplied through the keyboard input section 1 and the keyboard I/F section 11 to the interpretation processing section 14.

Figure 3:
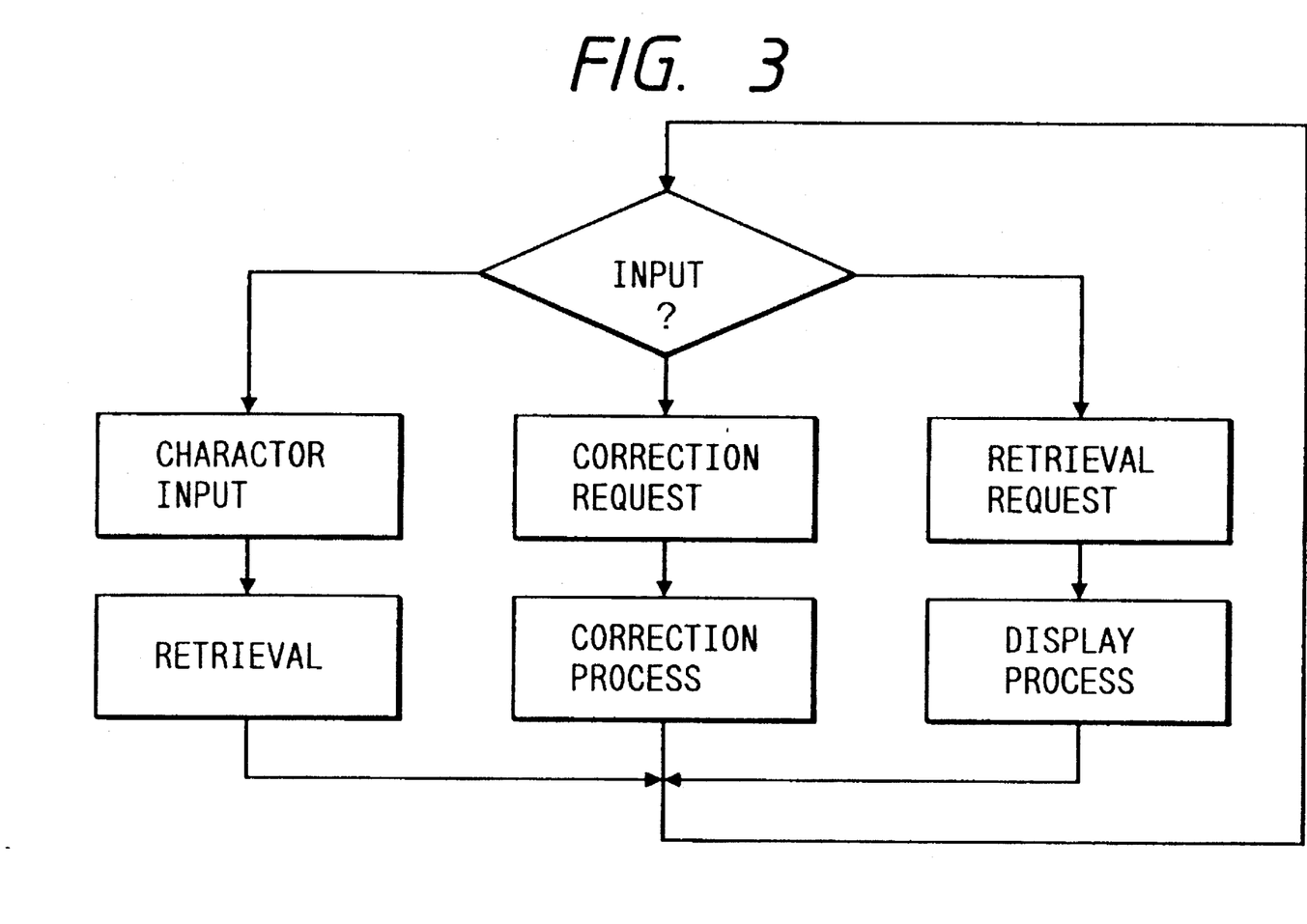
FIG. 3 is a flow chart showing a portion of an operation to be effected by the FIG. 2 main control section.

A description will be made hereinbelow with reference to FIGS. 2 and 3 in terms of the operation of the interpretation processing section 14 on the retrieval character train inputted picture. As illustrated in the flow chart of FIG. 3, the interpretation processing section 14 first checks whether the input from the keyboard input section 1 is a retrieval character, a request of retrieval or a request of correction. If inputting the retrieval character, the retrieval character information is supplied to the retrieval processing section 15 at every input. The retrieval processing section 15 combines the retrieval character with the previously inputted retrieval character(s) to perform the retrieval operation to successively retrain the combined retrieval characters as a new retrieval character train. In the case of the retrieval request, the retrieval processing section 15 retrieves the content corresponding to the retrieval character train and then displays it.

Retrieval 1

Figure 4A:
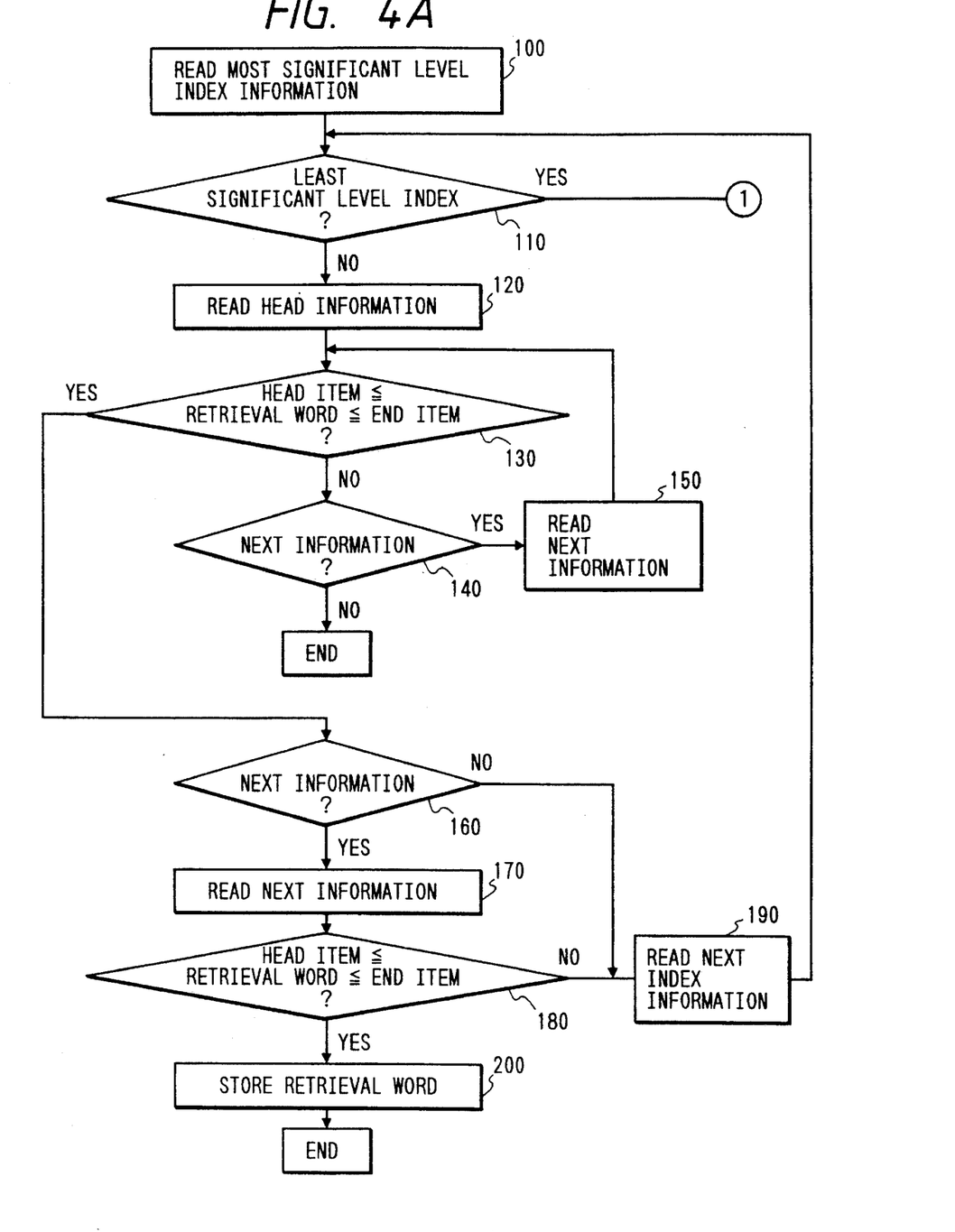
FIGS. 4A and 4B are flow charts for describing an operation before the decision of a retrieval character train.
Figure 4B:
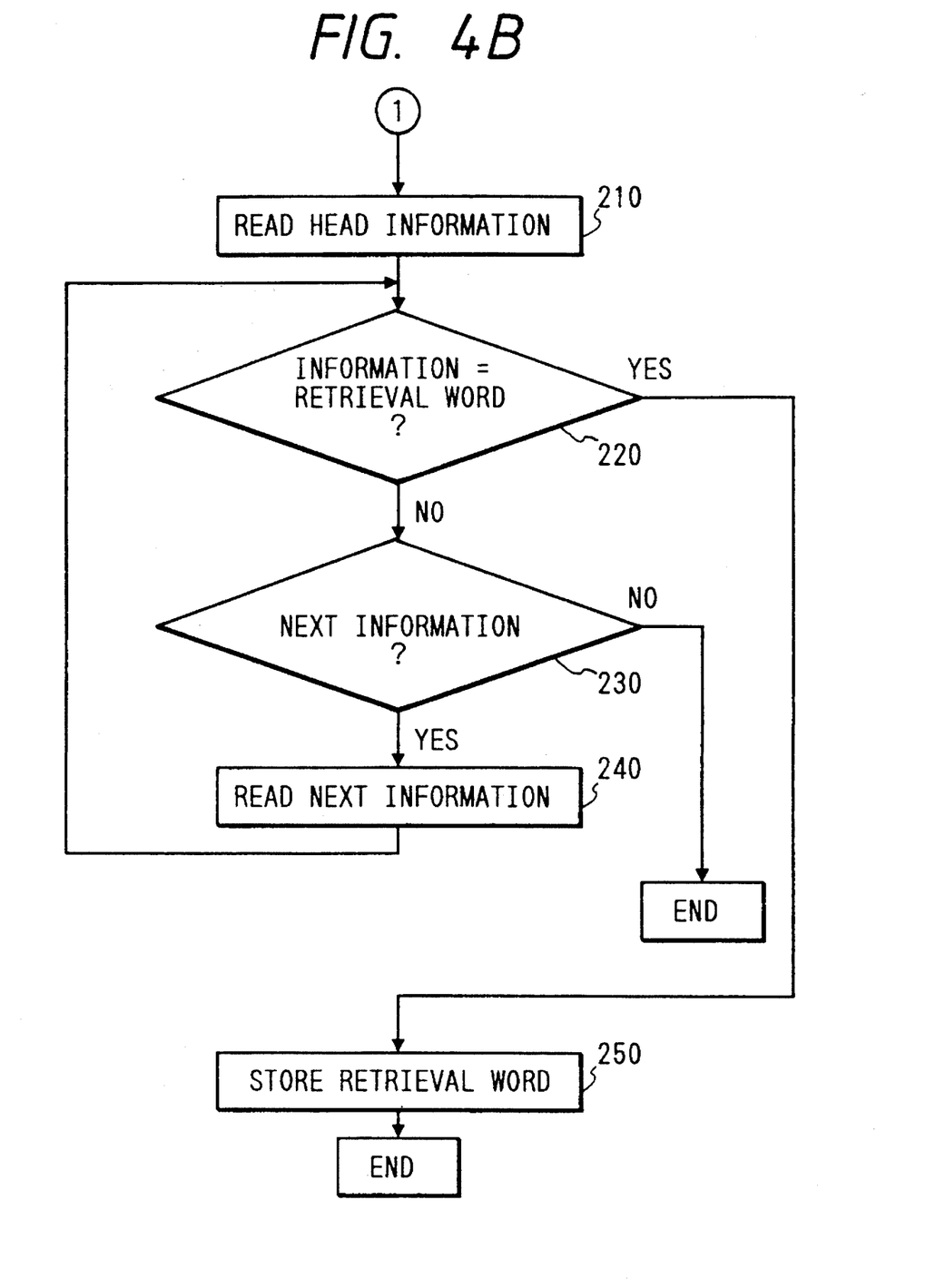
Figure 5A:
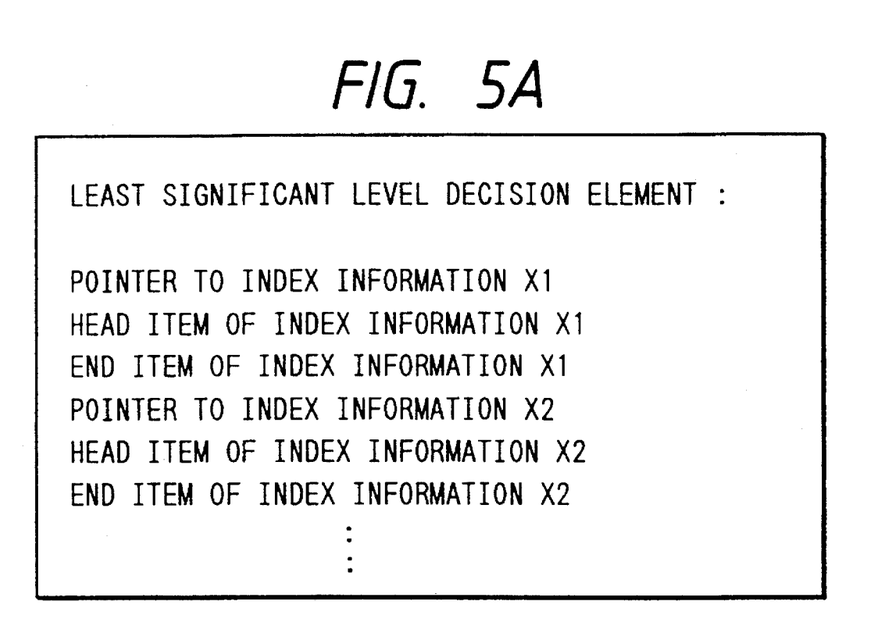
FIGS. 5A and 5B are illustrations of arrangements of index information to be used in the embodiment.
Figure 5B:
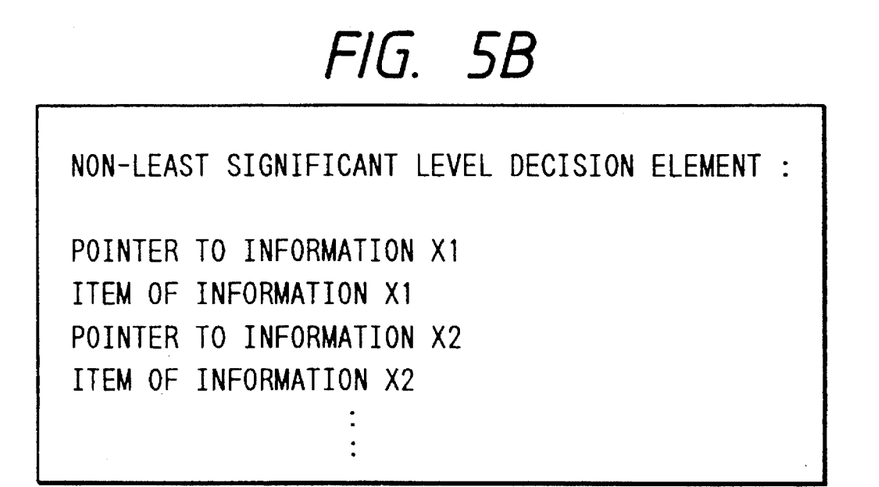

A description will be made hereinbelow with respect to FIGS. 2, 4A, 4B, 5A, 5B, 6A and 6B in terms of the retrieval operation in indeterminate state of the retrieval character train (in the case that the operator does not indicate the retrieval function). In FIGS. 4A and 4B, the retrieval processing section 15 first instructs the CD control section 2, through the CD I/F section 12, to read out the most significant level index information (step 100). The index information is information previously prepared in order to quickly retrieve the contents corresponding to the retrieval character train and takes a tree configuration. The retrieval processing section 15 successively accesses the index information in accordance with a predetermined procedure to retrieve the content corresponding to the retrieval character train. FIGS. 5A and 5B respectively show the contents of the index information. As illustrated in FIGS. 5A and 5B, the index information has two sets of information: one being the least significant level index information illustrated in FIG. 5A and the other being the non-least significant level index information (the index information other than the least significant level index information) illustrated in FIG. 5B. The most significant level index information corresponds to the root of a tree and the least significant level index information corresponds to the leaf of the tree.

Figure 6A:
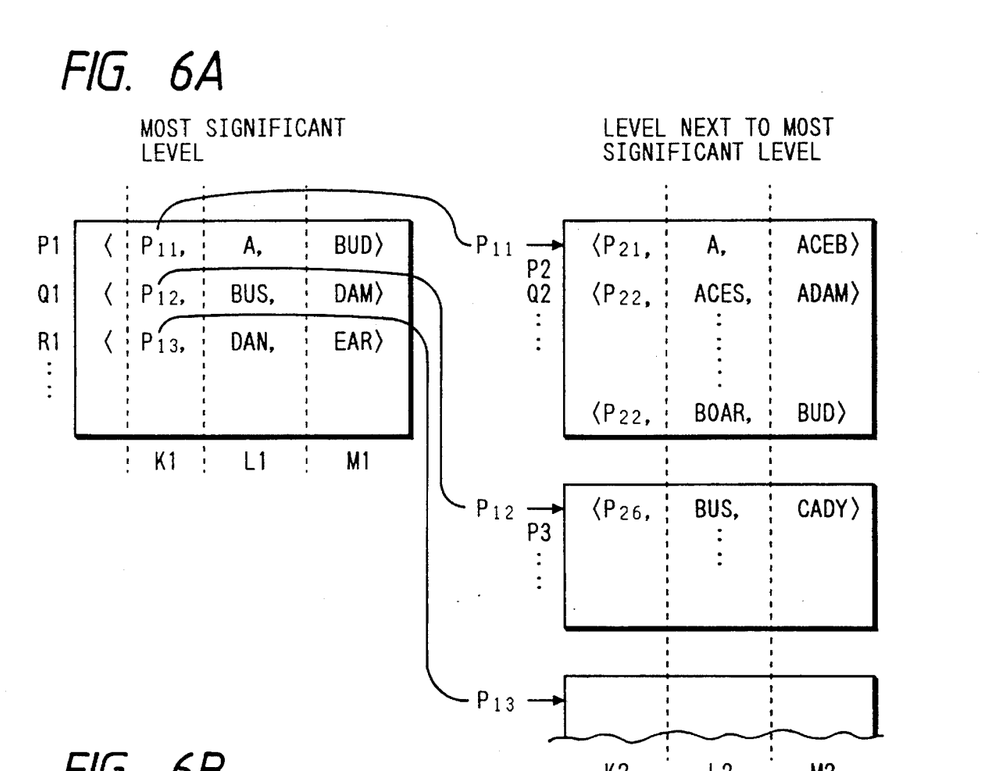
FIGS. 6A and 6B are illustrations for describing index information to be used in the embodiment.
Figure 6B:
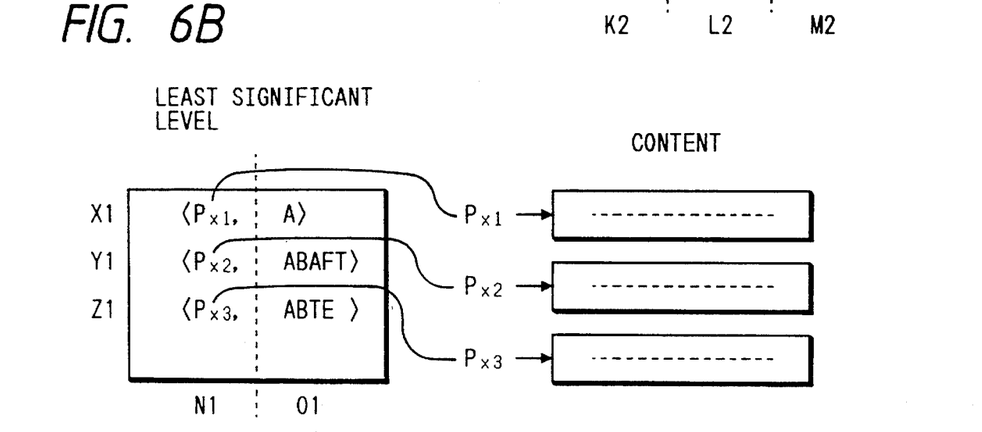

In the non-least significant level index information as shown in: FIG. 5B, at the head portion there is provided a decision element (information) which is used for distinguishing between the least significant level and non-least significant level, and after the decision element there are provided items and a set of pointers to the information corresponding to the items. Further, in the least significant level index information as shown in FIG. 5A, at the head portion there is provided a decision element which is used for distinguishing between the least significant level and non-least significant level, and following to the decision element there are provided plural sets of information. The information set comprises a factor "point to the next-level index information, item at the head of the next level-index information, item at the end of the next-level index information". FIGS. 6A and 6B schematically illustrate the structure of the index information. In FIG. 6A, the pointers to the next-level index information are indicated as K1 and K2, the head items of the next-level index information are indicated as L1 and L2, and the end items of the next-level index information are described as M1 and M2. In FIG. 6B, the pointer to the information corresponding to the item is indicated as N1 and the item is indicated as O1. In FIGS. 6A and 6B, $P_{11}$, $P_{12}$, $P_{13}$, $P_{21}$, $P_{22}$, $P_{2a}$, $P_{2b}$, $P_{x1}$, $P_{x2}$ and $P_{x3}$ respectively represent the values of the pointer information. Further, In FIG. 6A, the most significant level index information is composed of a set of information P1, Q1, R1 ••• . and in FIG. 6B, the least significant level index information is composed of a set of information X1, Y1, Z1 ••• . As shown in FIG. 6A, in the case of being not the least significant level index information, the items existing between the head item and the end item also exist within the next-level index information. Thus, the index information is retrieved by searching the pointer to the next-level index information which satisfies this condition. The set of information P1 indicates that the items positioned between the items A and BUD exist within the index information appearing when advancing along the pointer $P_{11}$.

Returning back to FIG. 4A, after reading out the index information, the retrieval processing section 15 determines whether or not the read index information is the least significant level index information (step 110).: If not the least significant level index information, the retrieval processing section 15 retrieves the next-level index information. That is, the head information is read out (step 120) and it is checked whether the retrieval character train satisfies the condition that "the head item of the next-level index information"≦"retrieval character train≦"the end item of the next-level index information (step 130). Here, an equation of a character train X≦a character train Y means X1≦Y1 and ••• and XL-1≦XL-1 and XL≦YL (L=M1N (M, N)) when characters of two character trains are described in accordance with the ISO (International Standardization Organization) code and taken as X1, X2, ••• , XN (N is the number of characters in the character train X), Y1, Y2, ••• , YM (M is the number of characters in the character train Y) in order from the head character train. The satisfaction of the aforementioned condition means that there is the possibility that the information for the retrieval character train exists at the lower level of the index information.

Figure 8:
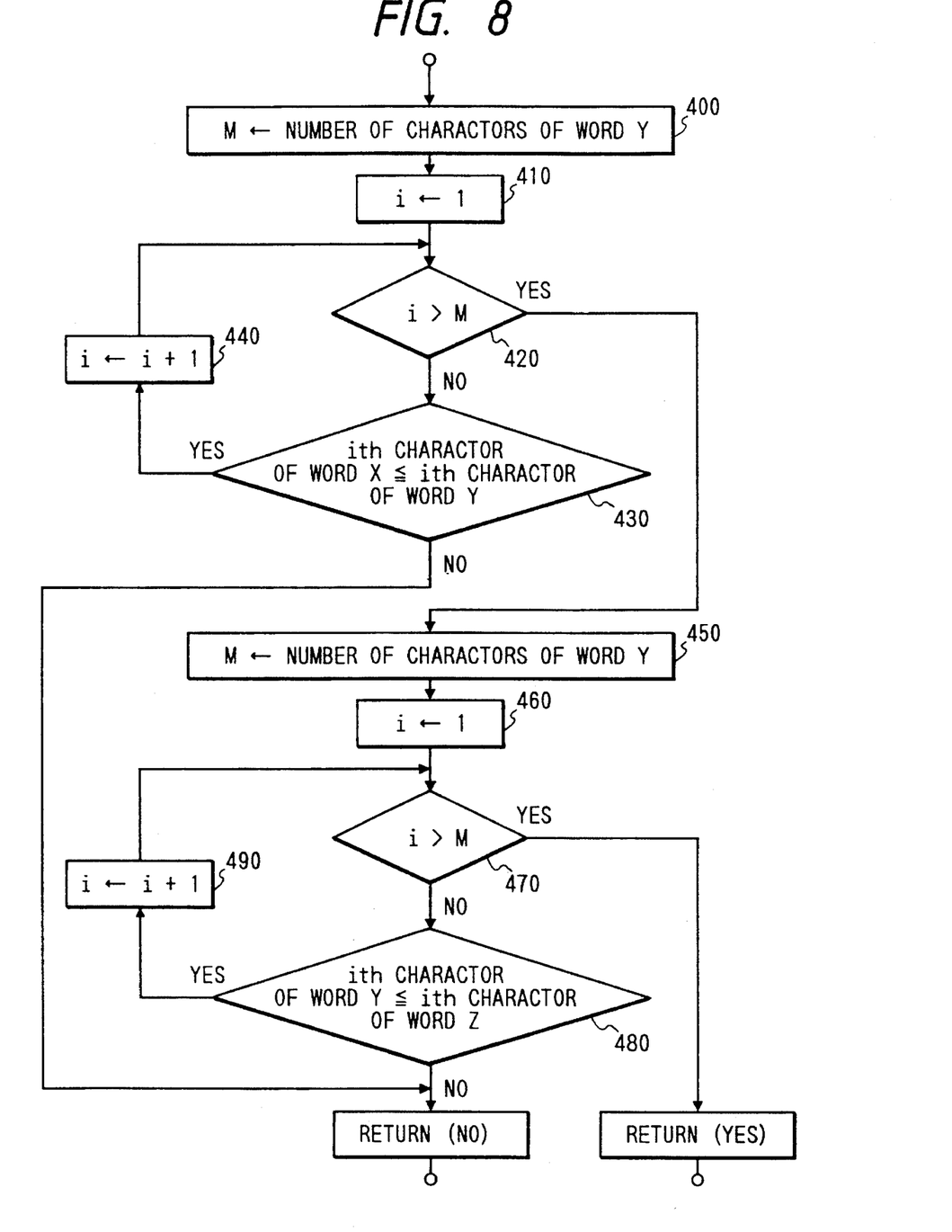
FIG. 8 is a flow chart showing a comparison operation of a retrieval character train in the embodiment.

Here, the process for the comparison between the character trains will be described hereinbelow with reference to FIG. 8. As illustrated in FIG. 8, the operation detects the short one of the length (the number of characters) of the character train X and the length (the number of characters) of the character train Y and sets the value as M (step 400). Subsequently, the first to Mth characters of the character train X are respectively compared with the first to Mth characters of the character train Y (steps 410 to 440). Here, this comparison is effected on the basis of the numerical codes of the respective characters. Now, assuming that a comparison is effected between A and B, since A is 41H (hexadecimal notation) and B is 42H (hexadecimal notation), the comparison result becomes A<B. For example, when the character train X is ANGEL and the character train Y is ANT, the number of characters of the character train X is 5 and the number of characters of the character train Y is 3, and hence the M value becomes 3. First, the first characters of the character trains X and Y are compared with each other. Since the first character of the character train X is A and the first character of the character train Y is A, a relation of "first character of the character train X"≦"first character of the character train Y" can be satisfied. Then, the second characters of the character trains X and Y are compared with each other. Since the second characters of the character trains X and Y are the same N, a relation of "second character of the character train X"≦"second character of the character train Y" can be satisfied. Finally, the third characters of the character trains X and Y are compared with each other. The third character of the character train X is G and the third character of the character train Y is T. Since G<T, a relation of "third character of the character train X"≦"third character of the character train Y" can similarly be satisfied. Thus, a decision of ANGEL≦ANT can be made. On the other hand, in the case that the character train X is ANT and the character train Y is ANGEL, since a relation of T<G is not made, a relation of ANT≦ANGEL cannot be satisfied.

Thereafter, similarly, the comparison between the character trains Y and Z is effected (steps 450 to 490).

Returning again to FIG. 4A, when not satisfying the aforementioned condition, it is checked whether the next set (information) exists or not (step 140). If the next set exists, the next set is read out and the aforementioned decision is repeatedly effected with respect to the next set (steps 150, 140). If not existing, a decision is made that the information for the retrieval character train does not exist, and therefore the retrieval operation is stopped. On the other hand, when satisfying the aforementioned condition, it is checked whether the number of the next-level index information is one. If so, the CD control section 2 is controlled to read out the next-level index information, then again performing the above-described procedure. On the other hand, if the number of the next-level index information is two or more, the current retrieval character train information is supplied to the longest retrieval character train storage section (minimum character train storage section) 17 (steps 160 to 200), thereafter terminating the retrieval process.

If the read index information is the least significant level index information, as illustrated in FIG. 4B, the head information of the least significant level index information is detected for comparison with the retrieval character train (steps 210, 220). Here, the comparison between a character train of the detected set and the retrieval character train is effected as follows. The first (head) to final characters of the retrieval character train are respectively compared with the first to final characters of the detected character train. If all the characters of the retrieval character train are coincident with the corresponding characters of the detected character train, a decision is made that the two character trains are coincident with each other. If the two character trains are coincident with each other, the retrieval character train is stored in the longest retrieval character train storage section 17 (step 250). If not coincident with each other, the retrieval character train is compared with the next detected character train set (steps 230, 240, 220).

In the case that an item coincident with all the sets of the least significant level index information cannot be obtained, a decision is made that the item corresponding to the retrieval character train does not exist.

Retrieval 2

Figure 7:
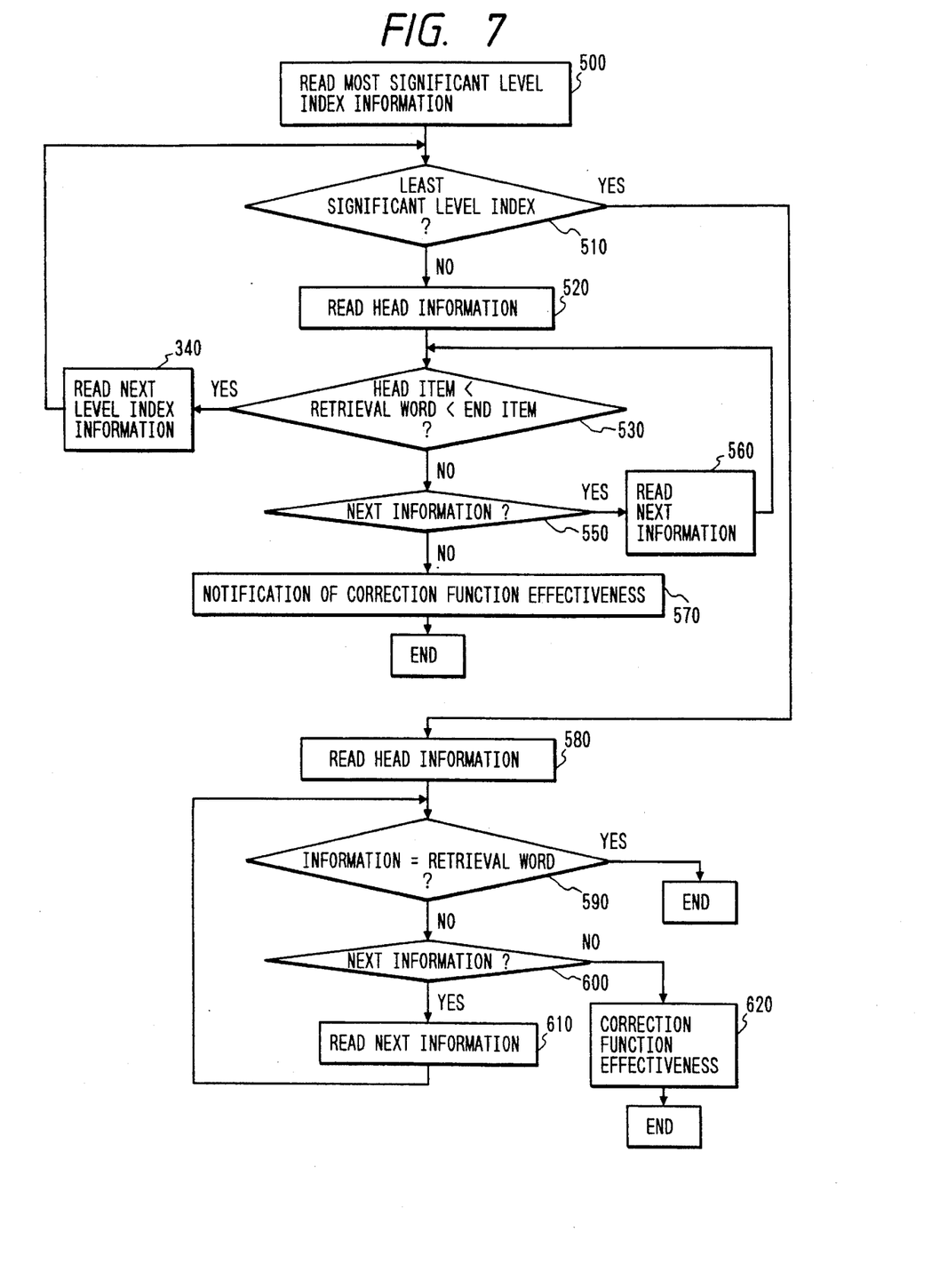
FIG. 7 is a flow chart showing a retrieval operation after the decision of a retrieval character train in the embodiment.

Further, a description will be made hereinbelow with reference to FIGS. 2 and 7 in terms of the retrieval operation in the decided state of the retrieval character train (in the case that the operator has indicated the retrieval function). In FIG. 7, the retrieval processing section 15 instructs the CD control section 2 to read out the most significant level index information (step 500). It is determined whether the read index information is the least significant level index information (step 510). This decision is effected as well in the case that the retrieval character train is not decided. If not the least significant level index information, the next-level index information is retrieved in accordance with the following procedure. That is, the head information is read out (step 520) and it is checked whether or not the retrieval character train satisfies the condition of "the head item of the next-level index information<"the retrieval character train<the end item of the next-level index information" (step 530). Here, when characters of two character trains are described in accordance with the JIS (Japanese Industrial Standard) code and taken as X1, X2, •••, XN (N is the number of characters in the character train X), Y1, Y2, •••, YM (M is the number of characters in the character train Y) in order from the head character train, an equation of a character train X<a character train Y means:

$$X1 < Y1;$$
$$X1 = Y1 \text{ and } X2 < Y2;$$
$$X1 = Y1 \text{ and } X2 = Y2 \text{ and } X3 < Y3;$$
$$\vdots$$
$$X1 = T1 \text{ and } \ldots XL - 1 = YL - 1 \text{ and}$$
$$XL < YL \ (L = \text{MIN } (M, N));$$
$$\text{or, } X1 = Y1 \text{ and } \ldots \text{ and } XN < YN \ (N = M)$$

If not satisfying the aforementioned condition, when the next set exists (step 550), the aforementioned determination is also effected with respect to the next set (step 560). When the next set does not exist (step 550), a decision is made that the information for the retrieval character train does not exist (step 570), thereby stopping the retrieval operation.

If satisfying the aforementioned condition, the CD control section 2 is instructed to read out the next-level index information and the same procedure is repeatedly effected (step 340).

On the other hand, if the read index information is the least significant level index information, the head set of the index information is detected (step 580) and it is checked whether or not a character train of the detected set is coincident with the retrieval character train (step 590). If not coincident therewith, it is checked whether the next set exists or not (600). If so, the aforementioned determination is again effected (610, 590). If not existing (600), a decision is made that the item for the retrieval character train does not exist (step 620). If in the step 590 the character train of the detected set is coincident with the retrieval character train, the retrieval character train information is stored in the longest retrieval character train storage section 17.

Due to the above-described two retrieval operations, it is checked at every input of one character, retrieval character whether the item corresponding to a retrieval character train exists within the optical disc. If existing, the retrieval character train is stored. If not existing, the retrieval processing section 15 informs the interpretation processing section 14 of no existence of the corresponding item. In response to the information from the retrieval processing section 15, the interpretation processing section 14 controls the LCD display function to indicate that the correction function becomes effective.

In a state that the correction function is effective, when the correction process request of the operator is supplied through the keyboard control section 1 and the keyboard I/F section 11 to the interpretation processing section 14, the interpretation processing section 14 performs a correction process request with respect to the correction processing section 16. The correction processing section 16 has access to the character train stored in the longest retrieval character train storage section 17 and instructs the LCD 6 to display the content thereof.

Figure 9:
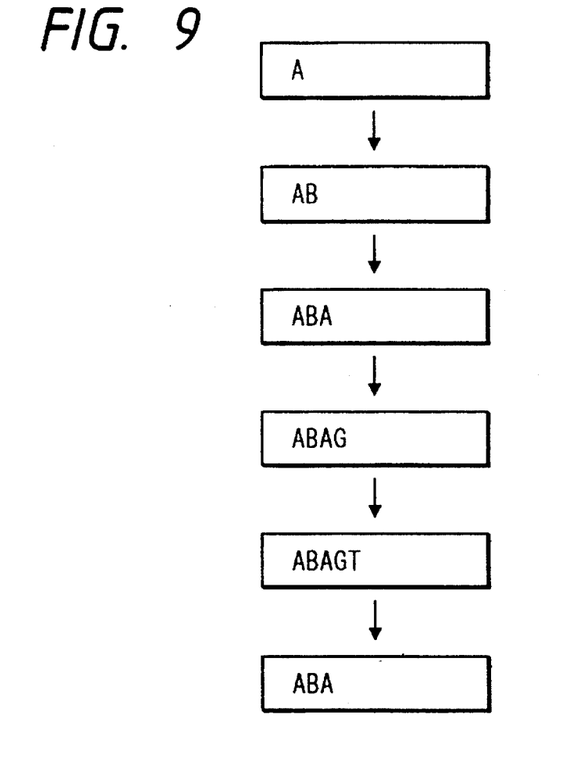
FIG. 9 is an illustration for describing variation of a retrieval character train.

Here, a description will be made in terms of an operation to be taken in the case that a character train "ABAGT" is inputted by mistake in place of a correct character train "ABAFT". For the description, let is be assumed that, as a keyword, "ABAFT" exists but a word starting from ABAG does not exist. As illustrated in FIG. 9, when the operator first inputs A, since a keyword starting from A exists, the retrieval processing section 15 informs the longest retrieval character train storage section 17 of A. Then, the operation inputs B. Since a keyword starting from AB exists, the retrieval processing section 15 informs the longest retrieval character train storage section 17 of AB. Further, the operator inputs A. Since a keyword starting from ABA exists, the retrieval processing section 15 informs the longest retrieval character train storage section 17 of ABA. Still further, the operator inputs G by mistake. Since a keyword starting from ABAG does not exist, the retrieval processing section 15 informs the interpretation processing section 14 of the fact that the corresponding item does not exist, whereby the interpretation processing section 14 indicates that the correction is effective. Even if the operator subsequently inputs T because the indication of the effectiveness of the correction function is too late, since the keyword starting from the retrieval character train does not exist, the content of the longest retrieval character train storage section 17 is not updated. Finally, in response to instruction of the correction by the operator, the correction processing section 16 refers to the content of the longest retrieval character train storage section 17 to know the character train ABA and then displays the character train "ABA".

A more detailed description of this operation will be made hereinbelow with reference to FIGS. 2, 6A, 6B and 7. In FIG. 2, the initial character A inputted by the operator is supplied through the keyboard I/F section 11 to the interpretation processing section 14. Since the input is a character, the interpretation processing section 14 informs the retrieval processing section 15 of a character A. The retrieval processing section 15 retrieves the index information in accordance with the flow chart shown in FIG. 7 in terms of A. First, the retrieval processing section 15 reads out the head table shown at the left side of FIG. 6A. This table is indicative of the most significant level index information in FIG. 7. This index information is not the least significant level index information. The retrieval processing section 15 reads out the head information, i.e., (A, BUD), in the index information. This head information indicates that the character trains between the character train A and the character train BUD exist at levels lower than that index information. Since the character A exists therebetween, the retrieval processing section 15 continuously reads out the information subsequent to the most significant level information, i.e., (BUS, DAM). Since the character A does not exist between BUD and DAM, the character A exists at a level lower than that information (A, BUD). Thus, the index information subsequent in level to the information (A, BUD) is read out. The index information read out herein is the index information illustrated at the right side of FIG. 6A. Since this index information is not the least significant level index information, the head information, i.e., (A, ACEB), is read out as well as in the most significant level index information. Since the retrieval character A is between A and ACEB, the next information (ACES, ADAM) is read out. Further, since the retrieval character A also exists between ACES and ADAM, there is a plurality of possibilities of reaching the next level, and hence the current retrieval character A is supplied to the longest retrieval character train storage section 17.

Here, a description will be made in terms of the fact that the retrieval character A exists between ACES and ADAM. Since the character train comparison is executed on the basis of the magnitude of the retrieval character train, in this case the comparison is effected with respect to one character at the head portion. Thus, the retrieval character A, A of ACES and A of ADAM are compared with each other, whereby a decision can be made that the retrieval character A exists between ACES and ADAM. This is because the input operation is not finished yet and the retrieval character to be inputted subsequently to the retrieval character A is not determined.

When B is inputted as a retrieval character, the retrieval processing section 15 combines this retrieval character with the previously inputted retrieval character A so as to form a retrieval character train AB. In the same manner as in the retrieval operation for the retrieval character A, the retrieval processing section 15 reads out the most significant level index information and further reads out the head information (A, BUD). Since the retrieval character train AB exists between A and BUD, the next information (BUD, DAM) is read out. Since the retrieval character train AB does not exist between BUD and DAM, as well as the retrieval character train A, the index information lower in level than the initial information (A, BUD) is read out. The head item of this index information is (A, ACEB). Since the retrieval character train AB exists between A and ACED, the next information (ACED, ADAM) is read out. Since the retrieval character train AB does not exist between ACED and ADAM, the information having a level subsequent to the head item (A, ACED) is read out. If the read out information is the index information shown in FIG. 6B, this information is the least significant level index information, and hence the head information thereof is first read out, whereby the character train A is known and compared with the retrieval character train AB. Since these are not coincident with each other, the next information ABAFT is read out. Since the retrieval character train AB is included in the character train ABAFT, the retrieval character train AB information is supplied to the longest retrieval character train storage section 17 to be stored therein.

Thereafter, in response to input of a retrieval character A by the operator, the retrieval processing section 15 combines A with the previously inputted retrieval character train AB so as to obtain a new retrieval character train ABA. An operation for this retrieval character train ABA is executed to read the least significant level index information as well as the retrieval character train AB. Similarly, since the retrieval character train ABA is included in the second information ABAFT, a decision can be made that a keyword corresponding to the retrieval character train exists. Thus, the retrieval processing section 15 informs the longest retrieval character train storage section 17 of the retrieval character train ABA.

Subsequently, when the operator inputs G as a retrieval character by mistake, similarly the retrieval character G information is supplied through the keyboard I/F section 11 and the interpretation processing section 14 to the retrieval processing section 15. The retrieval processing section 15 combines the retrieval character G with the retrieval character train ABA so as to form a new retrieval character train ABAG. As well as the retrieval character train AB, the retrieval processing section 15 reads out the index information existing at the level subsequent to the head information (A, BUD) of the most significant level index information to read out the least significant level index information existing at the level subsequent to the head information (A, ACED) of the read index information. Although the information of the least significant level index information is compared with the retrieval character train, unlike the character train AB, the retrieval character train ABAG is not included in the second information ABAFT, and the information next to the information ABAFT is ABATE and a relation of ABAFT<ABAG<ABATE is satisfied, whereby a decision can be made that a keyword for ABAG does not exist within the index information. That is, the information of the index information is arranged in increasing order, and hence, in the case that the information at a higher position as compared with the retrieval character train is once detected, the information corresponding to the retrieval character train does not exist after the detected information. Accordingly, the retrieval processing section 15 informs the operator that the correction function is effective. Further, after a determination that the corresponding keyword does not exist, there is no information to be supplied to the longest retrieval character train storage section 17. Thus, the longest retrieval character train storage section 17 is kept in the previous state, i.e., the state that the retrieval character train is ABA. In the case that the operator inputs T as a retrieval character because the indication of the correction function is not in time, an operation is performed which is the same as the operation taken when the character G is inputted. Thus, the content of the longest retrieval character train storage section 17 is not updated. Even if any retrieval character is inputted thereafter, since the corresponding item does not exist, the content of the longest retrieval character train storage section 17 is not changed.

The operator has found an error and requests the correction function of the system, this request is supplied through the keyboard I/F section 11 and the interpretation processing section 14 to the correction processing section 16. For the correction, the correction processing section 16 has access to the longest retrieval character train storage section 17 to obtain the longest retrieval character train information to again display its content on the LCD 6. In the above-described example, ABA is stored in the longest retrieval character train storage section 17 and displayed on the LCD 6.

According to this invention, as described above, there are provided the decision function for deciding the longest character train corresponding to the inputted character train which exists in the optical disc and the correction function for converting the inputted retrieval character train into the longest character train existing on the optical disc. In the case that the item corresponding to the inputted retrieval character train does not exist within the optical disc, the maximum effective portion of the retrieval character train is detected by the decision function and the retrieval character train is changed by the correction function in response to the correction instruction by the operator.

It should be understood that the foregoing relates only to preferred embodiments of the present invention, and that it is intended to cover all changes and modifications of the embodiments of the invention herein used for the purposes of the disclosure, which do not constitute departures from the spirit and scope of the invention.

What is claimed is:

1. A retrieval apparatus for retrieving information in a storage medium, comprising:

inputting means for inputting a retrieval character train;

reading means for reading information recorded in said storage medium;

retrieving means for successively retrieving said information at every input of each of characters of said retrieval character train;

decision means for checking, in response to the successive retrieval of said retrieving means, whether a character train made by the characters retrieved by said retrieving means exists in said information in said storage medium;

storage means for storing said character train when said decision means decides that said character train exists in said storage medium;

conversion means for converting the inputted retrieval character train into said character train finally stored in said storage medium;

notification means for notifying that said decision means decides that said character train does not exist in said storage medium; and display means for displaying that said character train does not exist in said storage medium.

2. A retrieval apparatus for retrieving information in a storage medium, comprising:

inputting means for inputting a retrieval character train;

reading means for reading information recorded in said storage medium;

retrieving means responsive to each successive input of a character of said retrieval character train for retrieving information and determining whether said inputted retrieval character train exists in said storage medium;

decision means for deciding as a longest character train a character train which is a maximum coincidence between the inputted retrieval character train and a character train existing in said storage medium;

conversion means for converting the inputted retrieval character train into said longest character train decided by said decision means;

notification means for, when said decision means decides that the inputted retrieval character train does not exist in said storage medium, notifying the decision of said decision means; and display means for displaying that the inputted character train does not exist in said storage medium.

3. A retrieval apparatus for retrieving information from an optical disk storing a plurality of character trains, each character train being paired with corresponding information, comprising:

reading means for reading out information corresponding to a retrieval character train;

input means for inputting a character train to be retrieved, said character train comprising a plurality of characters; and retrieving means for retrieving character trains from said optical disk, including said character train inputted by said input means, said retrieving means repeatedly executing automatic retrieval of said character train in response to each input of a character of said plurality of characters when said input character is added to said character train inputted by said input means.

4. A retrieval apparatus in accordance with claim 3, further comprising display means for displaying information corresponding to said character trains retrieved by said retrieving means.

5. A retrieval apparatus in accordance with claim 3, further comprising notification means for notifying that said character train inputted by said input means does not exist in said optical disk and display means for displaying that said character train inputted by said input means does not exist in said optical disk.

6. A retrieval apparatus for retrieving information from a storage medium storing a plurality of character trains, each character train being paired with corresponding information, comprising:

reading means for reading out information corresponding to a retrieval character train;

input means for inputting a character train, said character train comprising a plurality of characters;

retrieving means for retrieving character trains from said storage medium, including said character train inputted by said input means, said retrieving means repeatedly executing retrieval of said character train in response to each input of a character of said plurality of characters of said character train inputted by said input means; and correcting means for allowing a succeeding character of said character train to be inputted by said input means, when a previously inputted character group coincides with at least one of said plurality of character trains stored in said storage medium, and replacing said previously inputted character group by a character group stored in said storage medium, when said previously inputted character group does not coincide with any of said plurality of character trains stored in said storage medium.

7. A retrieval apparatus in accordance with claim 6, further comprising display means for displaying information corresponding to said character trains retrieved by said retrieving means.

8. A retrieval apparatus in accordance with claim 6, further comprising notification means for notifying, when an inputted character train does not exist in said storage medium, that said inputted character train does not exist in said storage medium and display means for displaying that said inputted character train does not exist in said storage medium.

9. A retrieval apparatus for retrieving information from a storage medium storing a plurality of character trains, each character train being paired with corresponding information, comprising:

reading means for reading out information corresponding to a retrieval character train;

input means for inputting a character train to be retrieved, said character train comprising a plurality of characters; and retrieving means for retrieving character trains from said storage medium, including said character train inputted by said input means, said retrieving means repeatedly executing retrieval of said character train in response to each input of a character of said plurality of characters of said character train inducted by said input means, further comprising checking means responsive to said retrieving means, for checking said character trains retrieved in response to each input of a character to determine whether a match exists between said inputted character train inputted by said input means and one of said retrieved character trains, thereby performing a checking function upon each retrieval by said retrieving means.

10. Retrieval apparatus as recited in claim 9, further comprising operating means responsive to said checking means for storing said inputted character train in said storage medium when said checking means determines a match exists between the inputted character train exists and one of said retrieved character trains from said storage medium, and, when said checking means determines that a match does not exist, for replacing said inputted character train by a previously stored inputted character train for which said checking means had determined a match exists with one of said retrieved character train from said storage medium.

* * * * *